United States Patent [19]

Sekiya et al.

[11] Patent Number: 5,436,772
[45] Date of Patent: Jul. 25, 1995

[54] MAGNETIC RECORDING AND REPRODUCING APPARATUS HAVING MAGNETO-RESISTANCE EFFECT ELEMENT

[75] Inventors: Tetsuo Sekiya, Kanagawa; Fumi Sugawara; Hideo Suyama, both of Miyagi, all of Japan

[73] Assignee: Sony Corporation, Tokyo, Japan

[21] Appl. No.: 902,880

[22] Filed: Jun. 23, 1992

[30] Foreign Application Priority Data

Jun. 24, 1991 [JP] Japan .................................. 3-151907
Mar. 26, 1992 [JP] Japan .................................. 4-068694

[51] Int. Cl.⁶ ........................ G11B 5/03; G11B 5/127
[52] U.S. Cl. ...................................... 360/66; 360/113
[58] Field of Search ............... 360/127, 126, 125, 122, 360/121, 113, 119, 68, 67, 66, 65, 61, 50, 48, 40

[56] References Cited

U.S. PATENT DOCUMENTS

| | | | |
|---|---|---|---|
| 4,471,403 | 9/1984 | Dress, Jr. et al. | 361/149 |
| 4,651,235 | 3/1987 | Morita et al. | 360/46 |
| 4,670,799 | 6/1987 | Oruga et al. | 360/66 |
| 4,717,975 | 1/1988 | Ogura et al. | 360/66 |
| 4,821,127 | 4/1989 | Soga et al. | 360/67 X |
| 4,879,609 | 11/1989 | Kozuki et al. | 360/66 |
| 4,881,143 | 11/1989 | Bhattacharyya et al. | 360/113 |
| 4,967,298 | 10/1990 | Mowry | 360/121 |
| 4,987,501 | 1/1991 | Hori | 360/66 X |
| 4,991,034 | 2/1991 | Sato | 360/67 |
| 5,168,395 | 12/1992 | Klassen et al. | 360/68 X |

*Primary Examiner*—Donald Hajec
*Assistant Examiner*—Thien Minh Le
*Attorney, Agent, or Firm*—Hill, Steadman & Simpson

[57] ABSTRACT

A magneto-resistance/inductive integrated composite magnetic head which has a stabilized reproduction output and is high in reliability. The magnetic head comprises a composite magnetic head including a magneto-resistance effect type head and an inductive type head integrated with each other and a recording coil, and an electric circuit for supplying, after recording, the recording coil of the composite magnetic head with an electric current which attenuates in a fashion of an alternating current from a value of a recording current or a value around or higher than such value of a recording current to another value in the proximity of the zero level.

3 Claims, 5 Drawing Sheets

MAGNETIC RECORDING AND REPRODUCING APPARATUS HAVING MAGNETO-RESISTANCE EFFECT ELEMENT

BACKGROUND OF THE INVENTION

1. Field of the Invention

This invention relates to an integrated composite head of a magneto-resistance effect (MR) type head and an inductive (Ind) type head.

2. Description of the Prior Art

A magneto-resistance type magnetic head is superior in short wavelength sensitivity and has been and is being progressively employed as various magnetic heads such as, for example, a reproducing magnetic head of a magnetic recording and reproducing head for a hard disk drive. Various composite heads have been proposed wherein recording is performed by a conventional inductive type head and reproduction is performed by a magneto-resistance type head. An exemplary one of conventional magneto-resistance/inductive composite magnetic heads is shown in FIG. 3 which has one-gap construction wherein a magnetic gap is common to component magnetic heads.

Referring to FIG. 3, the magneto-resistance/inductive composite magnetic head shown includes first and second thin film magnetic cores 11 and 12 stacked, for example, on a floating slider or the like itself or on a base plate 6 mounted on such floating slider or the like such that a magnetic gap g is defined between front end portions thereof at a contacting or opposing face of the magnetic head to a magnetic record medium, that is, at an ABS surface (air bearing surface) 5 of the magnetic head. At least an end of a magneto-resistance effect element 13 formed from a magneto-resistance effect thin film or an electrode 14a of the magneto-resistance effect element 13 is disposed in the magnetic gap g and is exposed at the ABS surface 5. The electrode 14a and the other electrode 14b of the magneto-resistance effect element 13 are each formed from a conductive thin film. A bias conductor 15 is disposed across the magneto-resistance effect element 13 by way of an insulating layer 16. When the bias conductor 15 is energized, it provides a magnetization condition of a required direction to the magneto-resistance effect element 13 so that the magneto-resistance effect element 13 may operate in a characteristic region wherein the magneto-resistance characteristic thereof exhibits a superior linearity and a high sensitivity. A head winding 17 is formed in a spiral pattern such that it may pass a magnetic coupling portion between the first and second thin film magnetic cores 11 and 12, for example, at individual rear portions. The bias conductor 15 and the head winding 17 are each formed from a conductive thin film. A protective film 22 is provided to cover over the elements described above.

In this manner, a magneto-resistance type magnetic head having a so-called shield type construction wherein the magneto-resistance effect element 13 is disposed between the first and second thin film magnetic cores 11 and 12 is constructed while an inductive type magnetic head wherein the head winding 17 is wound on a magnetic path composed of the first and second thin film magnetic cores 11 and 12, and a magneto-resistance/inductive composite magnetic head wherein the magnetic gap g is common to the magneto-resistance type magnetic head and the inductive type magnetic head is constructed.

In the magneto-resistance/inductive composite magnetic head, each of the thin film magnetic cores 11 and 12 functions as a shield for the magneto-resistance effect element 13 upon reproduction and as an induction core upon recording, and further functions, particularly upon reproduction, as a magnetic path of a bias magnetic field produced by energization of the bias conductor with a dc current.

With the conventional magneto-resistance/inductive type composite magnetic head of the construction described above, however, if the integrated composite magnetic head is used as an inductive type recording head to effect recording in a condition wherein a reproduction output of such a waveform as shown in FIG. 4A is obtained when the integrated composite magnetic head is used as a magneto-resistance type head to effect reproduction and then the integrated composite head is used as a magneto-resistance type head again to effect reproduction, then a reproduction waveform different from that shown in FIG. 4A is sometimes obtained as shown in FIG. 4B, resulting in variation in reproduction characteristics of the integrated composite magnetic head. This arises from the fact that the magnetic domain construction of the thin film magnetic cores is varied by a magnetic field induced by a recording current, which varies the permeability of the magnetic cores to vary the bias magnetic field strength. Consequently, the reproduction sensitivity of the magneto-resistance effect element 13 is varied, which deteriorates the reliability of the integrated composite magnetic head.

Meanwhile, an improved magneto-resistance type magnetic head having a stabilized reproduction output characteristic has been proposed by the assignee of the present patent application and is disclosed in Japanese Patent Laid-Open Application No. 60-47223. In the magnetic head, in a no-signal magnetic field condition before starting of a reproducing operation, an attenuating current is supplied to an energization portion for generating a bias magnetic field at a bias conductor, that is, a magneto-resistance effect element so as to start reproduction in a fixed magnetization condition in order to reduce the hysteresis characteristic of the reproduction output to stabilize the output and reduce Barkhausen noise.

With the magnetic head, however, since an attenuating current is supplied to the bias conductor, an energization current which can achieve sufficient demagnetization cannot be obtained. In this instance, while there is a demagnetization effect for the magneto-resistance effect element, a sufficient demagnetization effect cannot be obtained for components of the magnetic path such as the thin film magnetic cores. As a result, stabilization of the magnetic characteristics of the magnetic head as a whole cannot be achieved.

SUMMARY OF THE INVENTION

It is an object of the present invention to provide a magneto-resistance/inductive integrated composite magnetic head which has a stabilized reproduction output and is high in reliability.

In order to attain the object, according to an aspect of the present invention, there is provided a magnetic recording and reproducing apparatus having a magneto-resistance effect element, comprising a composite magnetic head including a magneto-resistance effect type head and an inductive type head integrated with each other and a recording coil, and an electric circuit for supplying, after recording, the recording coil of the composite magnetic head with an electric current which attenuates in a fashion of an alternating current from a value of a recording current or a value around or higher than such value of a recording current to another value in the proximity of the zero level.

Since the magnetic recording and reproducing apparatus having a magneto-resistance effect element comprises the electric circuit for supplying, after recording, the recording coil of the composite magnetic head with an electric current which attenuates in a fashion of an alternating current from a value of a recording current or a value around or higher than such value of a recording current to another value in the proximity of the zero level, such a variation of the reproduction characteristics as those described hereinabove in connection with conventional magnetic recording and reproducing apparatus can be suppressed. This was proved with a magnetic recording and reproducing apparatus constructed actually in accordance with the present invention. It can be considered that such suppression of the variation of the production characteristics arises from the following reason.

While magnetic layers such as a thin film magnetic core which form such a magnetic path as described above are made of a soft magnetic material, since such soft magnetic material is not in a completely magnetized condition, magnetic domains can assume various constructions. For example, even if a magnetic field of a dc pattern or an ac pattern is applied to the soft magnetic material by means of an ordinary demagnetizing apparatus, a low potential condition in static magnetic energy cannot always be obtained.

Accordingly, with a conventional magnetic recording and reproducing apparatus, when recording is performed by means of a recording coil, the magnetic domain construction of magnetic path components of the magnetic head such as a thin film magnetic core described hereinabove with reference to FIG. 3 is varied unstably by a magnetic field induced by a high recording current upon such recording, and consequently, the permeability of the magnetic path components such as the thin film magnetic core is varied.

The magnetic path components function, upon reproduction, as a magnetic path when a bias magnetic field is applied to the magneto-resistance effect element. Since the reproduction sensitivity of the magneto-resistance effect element depends upon selection of the bias magnetic field, it is necessary to set a bias current value with which a suitable bias magnetic field can be produced. However, with a conventional magnetic head, since the permeability of the magnetic path components is varied, even if a fixed bias current value is set, a bias magnetic field produced with such bias current is still unstable. As a result, the reproduction sensitivity is varied and a variation of the reproduction output is invited as described above.

Investigations of the inventors of the present invention have proved that, when a recording coil of a composite magnetic head is supplied, after recording, by a particular circuit construction, with an electric current which attenuates in a fashion of an alternating current from a value of a recording current or a value around or higher than such value of a recording current to another value in the proximity of the zero level, magnetic domains of the magnetic path components described above are put into a condition wherein they are lowest in static magnetic energy and accordingly are stable, and consequently, the construction of the magnetic domains is initialized normally into a fixed condition and the permeability of the magnetic path components is fixed. Consequently, the magneto-resistance effect element is supplied with a substantially fixed bias magnetic field by a fixed bias current to put the same normally into a fixed magnetization condition. As a result, the sensitivity of the magneto-resistance effect element is stabilized.

Further, while the electric circuit for supplying an attenuating current to the recording coil is provided according to the present invention, since such recording coil normally has a great number of turns, a comparatively high magnetic field can be produced at the magnetic path components such as the thin film magnetic core comparing with an alternative arrangement wherein an electric current is supplied to a bias conductor. Consequently, magnetic domains can be stabilized with a high degree of certainty and the magnetic characteristics of the entire magnetic head can be stabilized.

According to another aspect of the present invention, there is provided a recording method for a magnetic recording and reproducing apparatus which comprises an integrated composite magnetic head of a magneto-resistance effect type head and an inductive type head, comprising the step of supplying, after recording, a recording coil of the composite magnetic head with an electric current which attenuates in a fashion of an alternating current from a value of a recording current or a value around or higher than such value of a recording current to another value in the proximity of the zero level. Preferably, the initial value of the attenuating current is equal to or less than three times or so the value of a recording current.

The above and other objects, features and advantages of the present invention will become apparent from the following description and the appended claims, taken in conjunction with the accompanying drawings.

DETAILED DESCRIPTION OF THE PREFERRED EMBODIMENT

Figure 1:
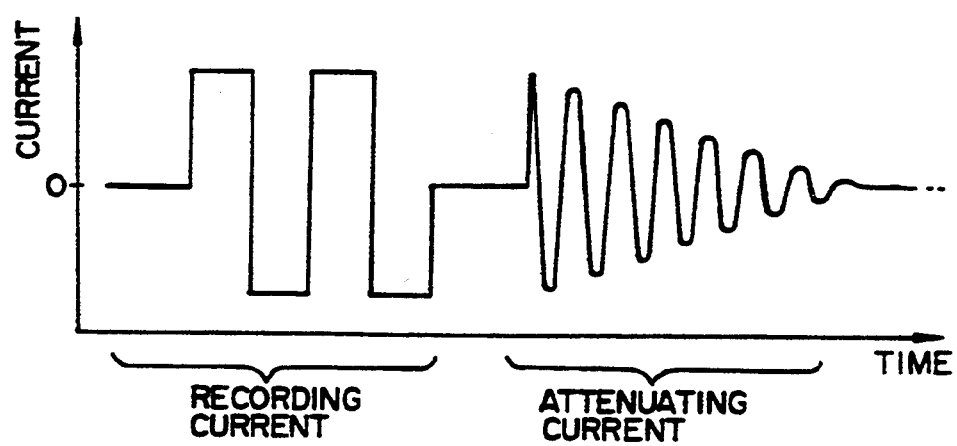
FIG. 1 is a diagram showing a waveform of an electric current to be supplied to a recording coin in a magnetic recording and reproducing apparatus having a magneto-resistance effect element according to the present invention.

A magnetic recording and reproducing apparatus having a magneto-resistance effect element to which the present invention is applied will be described in detail with reference to FIGS. 1, 2A and 2B. The magnetic recording and reproducing apparatus comprises such a magneto-resistance/inductive composite magnetic head as described hereinabove with reference to FIG. 3 wherein a magneto-resistance type head and an inductive type head have a common magnetic gap g. The magnetic recording and reproducing apparatus further comprises an electric circuit for supplying such an electric current to a recording coil after recording that attenuates in a fashion of an alternating current from a recording current value or a current value around or higher than such recording current value to another current value in the proximity of the zero level.

Figure 3:
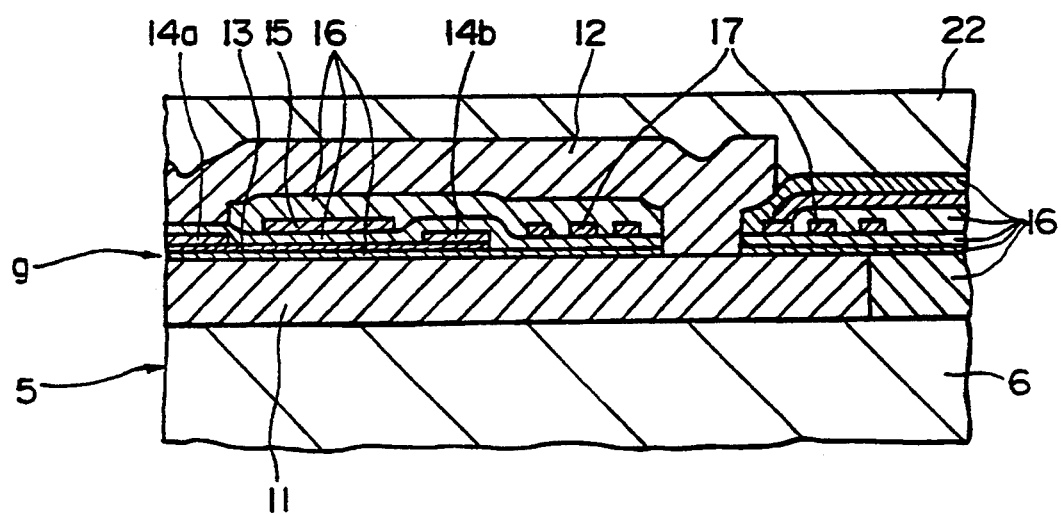
FIG. 3 is a schematic enlarged sectional view of a magnetic recording and reproducing apparatus having a magneto-resistance effect element.
Figure 4A:
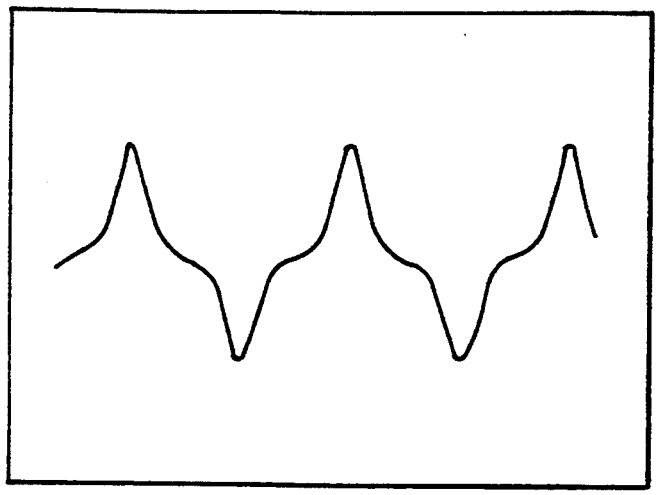
FIGS. 4A and 4B are diagrams showing waveforms of reproduction outputs of a conventional magnetic recording and reproducing apparatus having a magneto-resistance effect element.
Figure 4B:
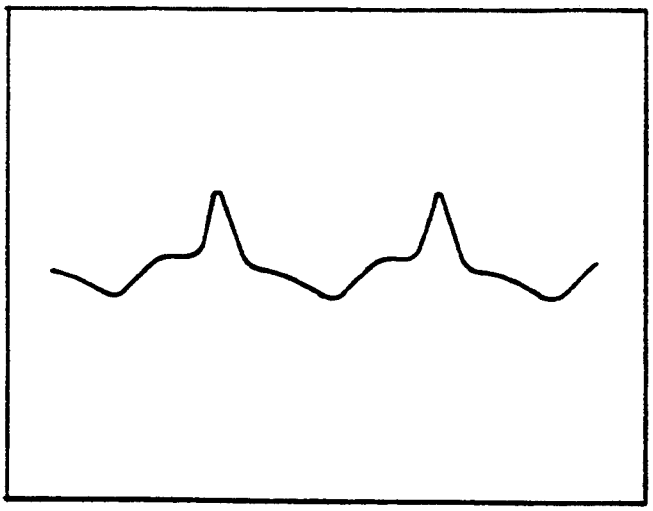
Figure 5:
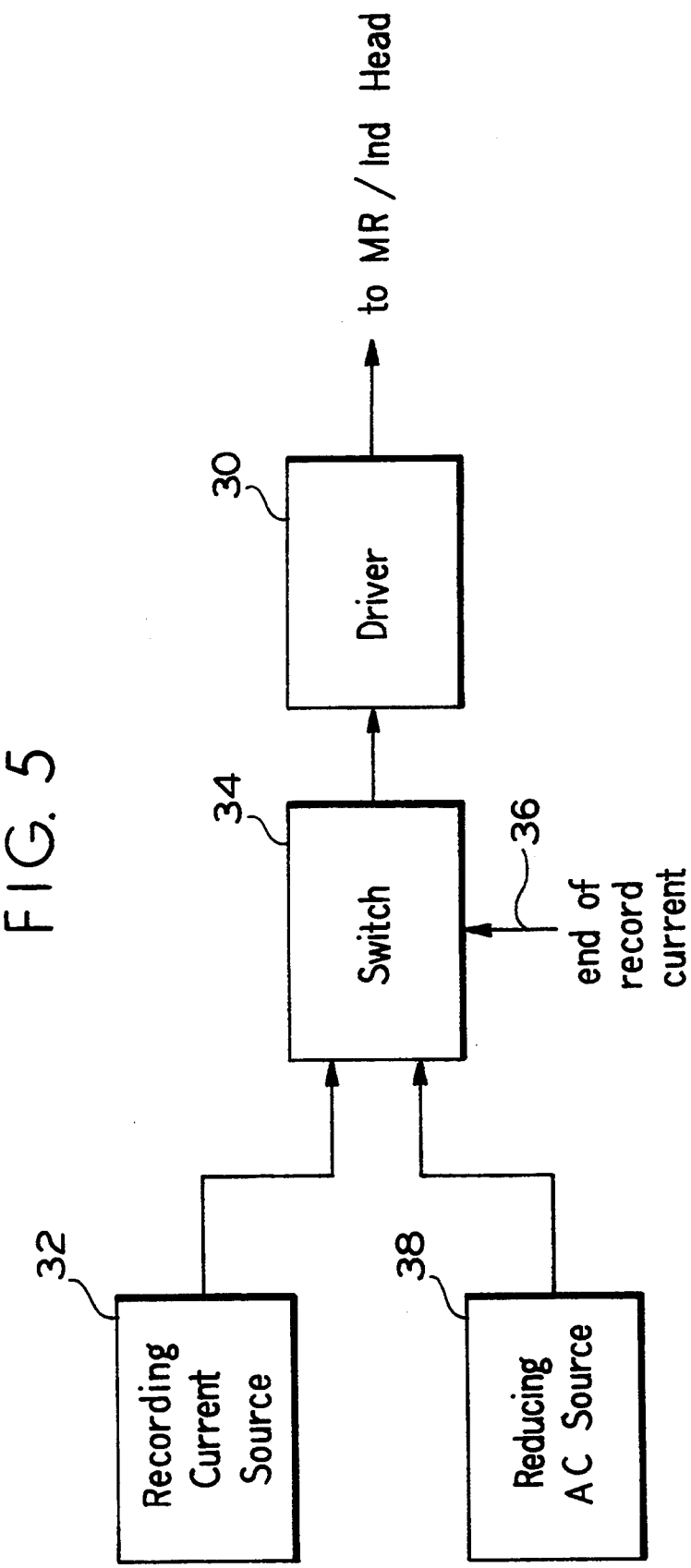
FIG. 5 is a functional block diagram of an electrical circuit in accordance with the present invention. A driver 30 supplies current to the MR/induction head. The current supply to the recording head of the MR/induction head originates with a recording current source 32, and is supplied to the driver through a switch 34. At the end of the record current, the switch is operated by a control line 36, and thereafter the reducing source 38 is connected to the driver 30 through the switch 34.

The electric circuit is connected to the recording coil, that is, the head winding 17 in FIG. 3, and supplies an electric current to the head winding 17 such that it first supplies a recording current of a rectangular waveform and supplies, immediately after then, an attenuating current of, for example, a substantially sine waveform.

Figure 2A:
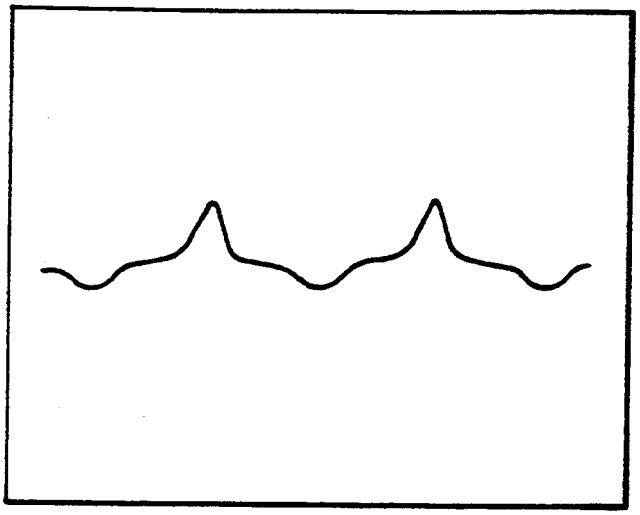
FIGS. 2A and 2B are diagrams showing waveforms of reproduction outputs of the magnetic recording and reproducing apparatus having a magneto-resistance effect element according to the present invention.
Figure 2B:
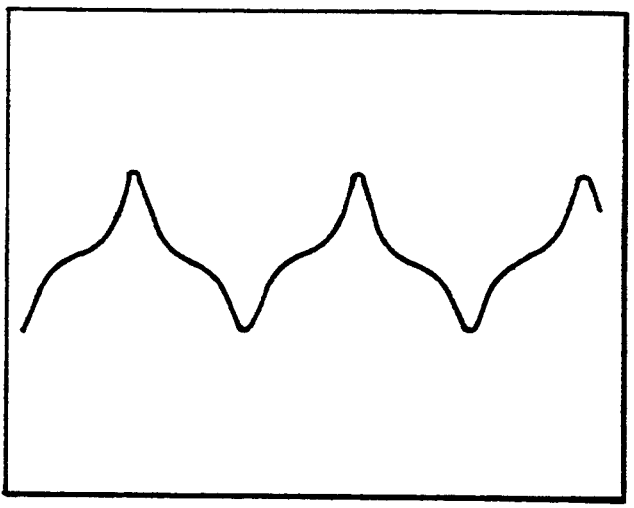

While the waveform of a reproduction output exhibits variations as shown in FIG. 2A after recording is performed by a conventional magnetic recording and reproducing apparatus, the waveform of a reproduction output after recording is performed by the magnetic recording and reproducing apparatus according to the present invention exhibits a comparatively low variation and a fixed output waveform can be obtained stably as seen from FIG. 2B.

In this manner, according to the present invention, since an attenuating current is supplied to a recording coil, the value of an initial magnetic field by the attenuating current can be made sufficiently high and the magnetic domain construction of components of a magnetic path such as a thin film magnetic core can be fixed with certainty. As a result, stabilization of the magnetic characteristics of the entire magnetic head can be achieved.

It is to be noted that, while, in the embodiment described above, an electric current which attenuates from a value of a recording current to the zero level is supplied, another electric current may otherwise be supplied which attenuates from a value higher than such value of a recording current to another value in the proximity of the zero level. For example, variation of a reproduction output was successfully suppressed with certainty even when an electric current was supplied which attenuated in a fashion of an alternating current from a value 1.5 to 2 times the value of a recording current to the zero level.

On the other hand, when the initial value of the attenuating current exceeds 3 times the value of a recording current, the insulating layer 16 adjacent the recording coil, that is, the head winding 17 shown in FIG. 3, may possibly be heated to a temperature higher than its highest resisting temperature. Therefore, the attenuating current preferably has an initial value lower than three times or so the value of a recording current.

Further, according to the present invention, a lowest condition in static magnetic energy can be obtained with a high degree of reproducibility by supply of the attenuating current without relying upon magnetic domain construction of the components of the magnetic path of the magnetic head. In particular, the present invention can be applied to various magnetic recording and reproducing apparatus having different magnetic domain constructions such as, for example, a magnetic recording and reproducing apparatus wherein magnetic domains at components defining the magnetic gap g extend in parallel or perpendicularly to the direction of the length of the magnetic gap g.

Having now fully described the invention, it will be apparent to one of ordinary skill in the art that many changes and modifications can be made thereto without departing from the spirit and scope of the invention as set forth herein.

What is claimed is:

1. A magnetic recording and reproducing apparatus having a magneto-resistance effect element in which the sensitivity of the MR element of an unshielded MR Head is stabilized, comprising a composite magnetic head including a magneto-resistance effect type head and an inductive type head integrated with each other and a recording coil, and an electric circuit for supplying, after recording, said recording coil of said composite magnetic head with an electric current which attenuates in a fashion of an alternating current from a value of a recording current or a value around or higher than such value of a recording current to another value in the proximity of the zero level to achieve a fix permeability in the magnetic path.

2. A recording method for a magnetic recording and reproducing apparatus which comprises an integrated composite magnetic head of a magneto-resistance effect type head and an inductive type head in which the sensitivity of the MR element of an unshielded MR Head is stabilized, comprising the step of supplying, after recording, a recording coil of said composite magnetic head with an electric current which attenuates in a fashion of an alternating current from a value of a recording current or a value around or higher than such value of a recording current to another value in the proximity of the zero levels to achieve a fix permeability in the magnetic path.

3. A recording method according to claim 2, wherein the initial value of the attenuating current is greater than, but equal to or less than three times, the value of a recording current.

* * * * *